United States Patent
Gautney (10) Patent No.: US 6,669,556 B2
(45) Date of Patent: Dec. 30, 2003

(54) OUTDOOR FAN SYSTEM

(76) Inventor: James Cameron Gautney, 100 Pickwick Dr., Sheffield, AL (US) 35660

(*) Notice: Subject to any disclaimer, the term of this patent is extended or adjusted under 35 U.S.C. 154(b) by 0 days.

(21) Appl. No.: 09/978,646

(22) Filed: Oct. 16, 2001

(65) Prior Publication Data

US 2003/0073401 A1 Apr. 17, 2003

(51) Int. Cl.[7] .................................................. F24F 7/007
(52) U.S. Cl. ...................... 454/338; 23/386; 454/256; 454/337; 454/370
(58) Field of Search ................... 454/256, 258, 454/337, 338, 370, 306, 230, 233, 902; D23/342, 351, 356, 383, 386, 499; 62/78, 261, 260, 265

(56) References Cited

U.S. PATENT DOCUMENTS

| | | | |
|---|---|---|---|
| 1,391,592 A | * 9/1921 | Stone | 261/102 |
| 2,215,753 A | * 9/1940 | Goadman et al. | 239/214.25 |
| 2,871,057 A | 1/1959 | Bernyk | |
| 3,444,799 A | * 5/1969 | Covington | 135/16 |
| 3,742,189 A | * 6/1973 | Conroy et al. | 126/521 |
| D245,511 S | 8/1977 | Lewis | D23/155 |
| D282,396 S | 1/1986 | Weaver | D23/162 |
| 4,753,496 A | 6/1988 | Bussard | 312/236 |
| 4,775,001 A | * 10/1988 | Ward et al. | 165/108 |
| 4,899,027 A | 2/1990 | Wong | 219/10.493 |
| 5,011,034 A | 4/1991 | Abel | 220/23.86 |
| 5,160,517 A | 11/1992 | Hicks et al. | 55/385.1 |
| 5,230,720 A | 7/1993 | Kendall | 55/210 |
| 5,285,961 A | * 2/1994 | Rodriguez, Jr. | 236/47 |
| D361,414 S | 8/1995 | Trautloff et al. | D32/15 |
| 5,568,824 A | 10/1996 | Cordrey | 137/355.27 |
| 5,904,755 A | 5/1999 | Kanazashi et al. | 96/55 |
| D410,824 S | 6/1999 | Kowanacki et al. | D8/1 |
| 5,988,207 A | 11/1999 | Kownacki et al. | 137/355.27 |
| D435,405 S | 12/2000 | Clark, Jr. | D8/1 |
| 2001/0053666 A1 | * 12/2001 | Shih-Ting | 454/233 |

FOREIGN PATENT DOCUMENTS

| | | | | |
|---|---|---|---|---|
| JP | 61-268927 | * 11/1986 | | 454/233 |
| JP | 1-305239 | * 12/1989 | | 62/261 |

* cited by examiner

*Primary Examiner*—Harold Joyce
(74) *Attorney, Agent, or Firm*—Waddey & Patterson; Larry W. Brantley (57) ABSTRACT

A camouflaged outdoor fan system includes a housing, a fan inserted into the housing, and a camouflaged lid removably connected to the housing. The housing is buried in the ground, or in alternative embodiment, mounted to the underside of a deck, the fan is inserted into the enclosure, and the camouflaged lid is placed over the fan to hide the fan and enclosure from view. The fan is operable to generate and propel an air stream out of the housing that can be used for cooling purposes. The system also may include optional features, such as a water-misting device, a heater, motion detectors, an evaporative cooling assembly, a temperature switch, a humidity switch, a rain gauge switch, a wind sensor switch, a dc power source, solar cells, or a remote control system.

23 Claims, 11 Drawing Sheets

OUTDOOR FAN SYSTEM

BACKGROUND OF THE INVENTION

The present invention relates generally to fan systems. More particularly, this invention pertains to a camouflaged outdoor fan system.

Camouflaged fan systems used to generate air streams are known in the art. For example, U.S. Pat. No. D245,511, issued to Lewis on Aug. 23, 1977 and entitled "Combined Furniture Commode and Room Fan," discloses a fan system that includes a fan mounted in a lower portion of a commode. U.S. Pat. No. 4,753,496, issued to Bussard on Jun. 28, 1988 and entitled "Cabinet With Built-In Fan," discloses a fan system that includes a fan installed inside a cabinet. U.S. Pat. No. 4,899,027, issued to Wong on Feb. 6, 1990 and entitled "Double-Effect Table With Heating And Cooling Purposes," teaches the use of a fan installed in a foot stand support for a table.

None of the above-referenced patents, however, suggest or teach a camouflaged fan system suitable for generating air streams outdoors. In addition, ceiling fan systems, which are also known in the art and are used to provide air streams outdoors during hot summer days, are not always suitable for outdoor cooling.

First, ceiling fan systems are typically mounted above an area to be cooled on a house, building, or some other type of support structure. In some cases, however, the use of a ceiling fan is not possible because the area to be cooled is not located close to a support structure. More importantly, in other cases, the appearance of a ceiling fan is simply undesirable.

What is needed, then, is an outdoor fan system for generating air streams that does not require a support structure, such as a house or building, and that does not have the appearance of a conventional ceiling fan system.

SUMMARY OF THE INVENTION

The present invention satisfies the above-referenced need using a camouflaged outdoor fan system that includes a housing, a fan (or air blower) inside the housing, and a camouflaged lid removably connected to the housing. The housing is adapted to be buried in the ground, either partially or completely, and is water, mildew, and ultraviolet light resistant. The housing is also soundproof in order to reduce noise generated by the fan. The fan is operable to generate an air stream by drawing air in through a lid air inlet port defined in the camouflaged lid and blowing air out through a lid air outlet port defined in the camouflaged lid.

In one embodiment, the camouflaged outdoor fan system of the present invention includes a housing, a fan, and a simulated rock lid. In a second embodiment, the system of the present invention includes a housing, a fan, and a planter lid, i.e., a lid that includes one or more plants. In a third embodiment, the system includes a housing, a fan, and a promotional sign lid. In a fourth embodiment, the present invention includes a housing, a fan, and a deck mount lid adapted to be mounted beneath a deck. In a fifth embodiment, the system of the present invention includes a housing, a fan, and a fence mount lid adapted to be connected to the backside of a fence.

All of the above-referenced embodiments may also include optional equipment, such as a water-misting device, an evaporative cooling assembly, a heater, an oscillating air stream directional guide, a variable speed fan, a remote control system, temperature switches, humidity switches, rain gauge switches, solar cells, a DC power source, or some combination thereof.

The present invention can be used in a variety of locations. For example, the present invention can be used in residential gardens and backyards, sports arenas, amusement parks, greenhouses, municipal parks, national parks, state parks, zoos, national monuments, outdoor restaurants, fishing piers, boat docks, campsites, or recreational vehicles (RVs). In addition, the present invention can be used around pools, decks, patios, walkways, movie theater waiting lines, outdoor automatic teller machines (ATMs), car washes, schools, daycares, kennels, barns and downtown shopping areas along sidewalks. In short, the present invention may be used anywhere there is a need for outdoor cooling.

DESCRIPTION OF THE PREFERRED EMBODIMENTS

Figure 1:
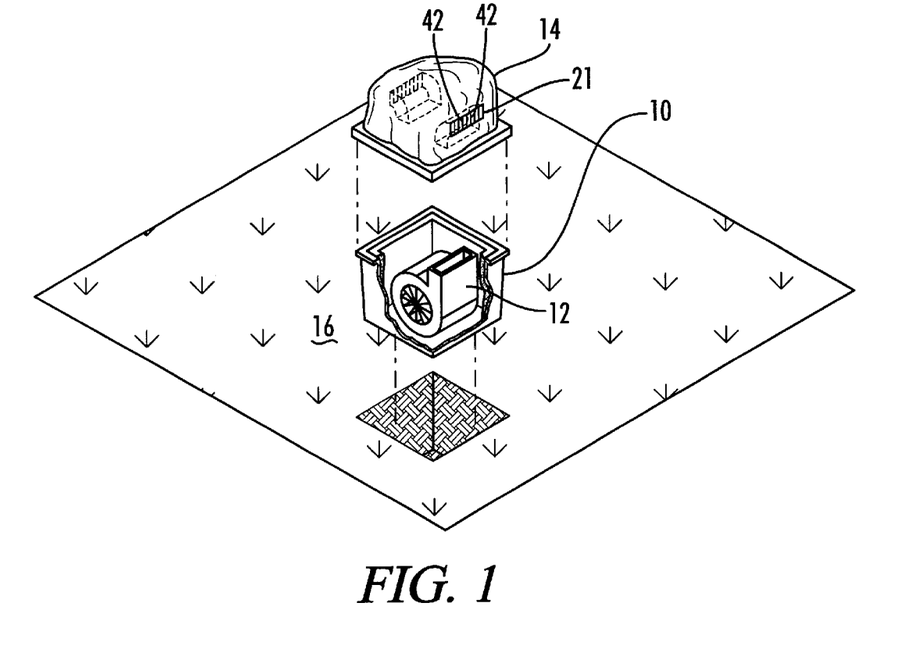
FIG. 1 is an exploded perspective view of a first embodiment of the present invention.
Figure 2:
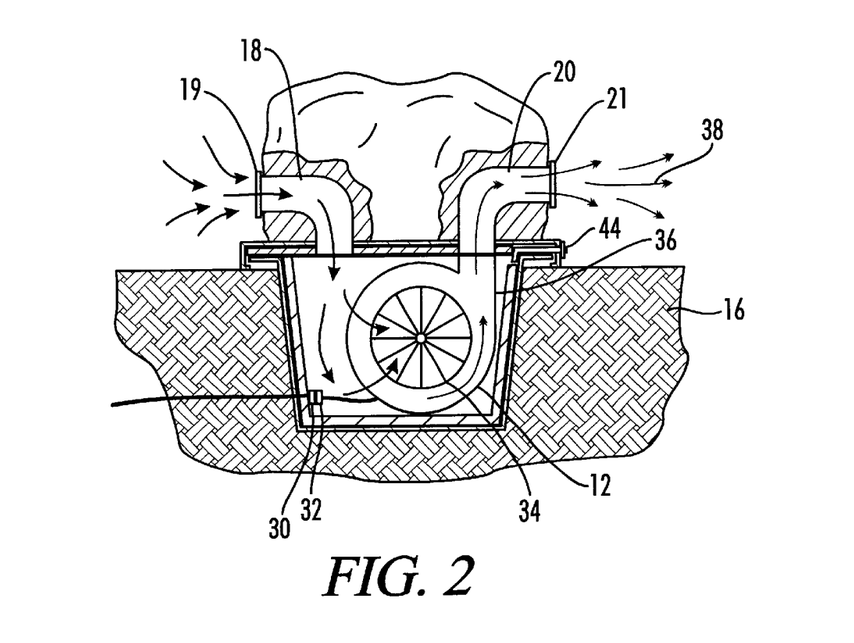
FIG. 2 is a cross-sectional view of the first embodiment of the present invention.
Figure 3:
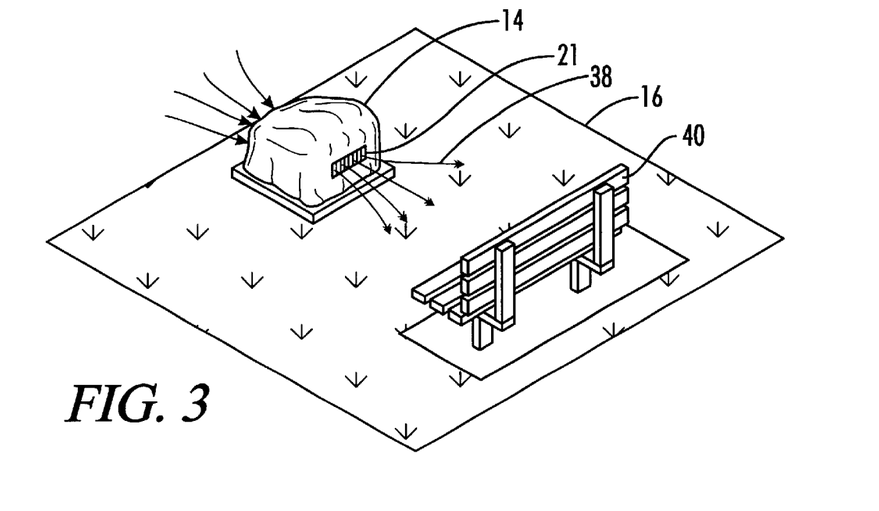
FIG. 3 is a perspective view of the first embodiment of the present invention positioned to blow an air stream on a park bench.

Referring to FIGS. 1–3, a first embodiment of the present invention includes a housing 10, a variable speed fan 12 positioned inside the housing 10, and a rock-shaped lid 14 removably connected to the housing 10. The housing 10 is buried in the ground 16 and provides support for the fan 12. The housing 10 is soundproof, in order to reduce the noise generated by the fan 12, and water resistant, to reduce the amount of water entering the housing 10 from the ground 16. In addition, the housing 10 is ultraviolet (UV) resistant and mildew resistant as well.

The rock-shaped lid 14 includes a lid air inlet port 18, which allows air to be drawn into the housing 10 by the fan 12, and a lid air outlet port 20, which allows air to be blown out of the housing 10 by the fan 12. In addition, the lid 14 includes a bug screen 19 connected over the lid air inlet port 18 and a diffuser grill 21 connected over the lid air outlet port 20. The bug screen 19 prevents bugs from being drawn into the housing 10 and the diffuser grill 21.

Figure 4:
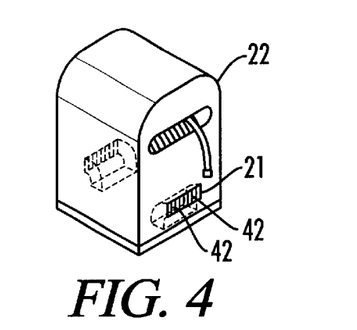
FIG. 4 is a perspective view of a garden hose reel lid used with the present invention.
Figure 5:
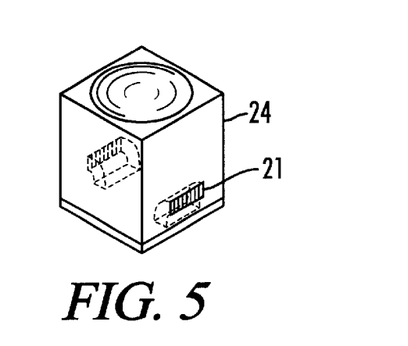
FIG. 5 is a perspective view of a birdbath lid used with the present invention.
Figure 6:
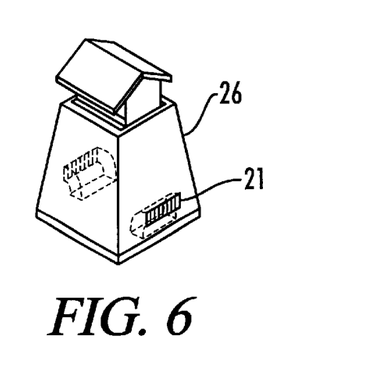
FIG. 6 is a perspective view of a bird feeder lid used with the present invention.
Figure 7:
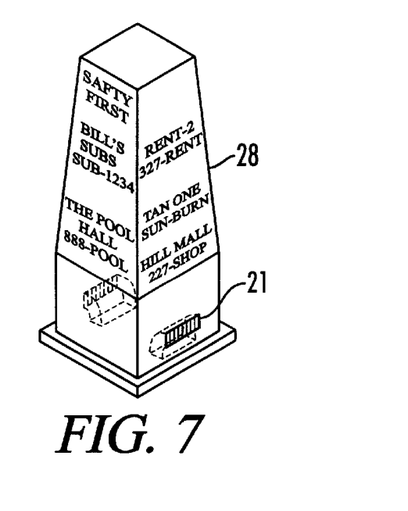
FIG. 7 is a perspective view of a promotional sign lid used with the present invention.

Although the lid 14 shown in FIG. 1 is rock-shaped, alternative embodiments may use other shapes as well. For example, the lid 14 may be a garden hose reel lid 22 (see FIG. 4), a birdbath lid 24 (see FIG. 5), a bird feeder lid 26 (see FIG. 6), or a promotional sign lid 28 (see FIG. 7). Furthermore, all of the lids have a common housing interface and are interchangable. Thus, the rock lid 14 may be replaced with the birdbath lid 24 or the promotional sign lid 28.

Figure 8:
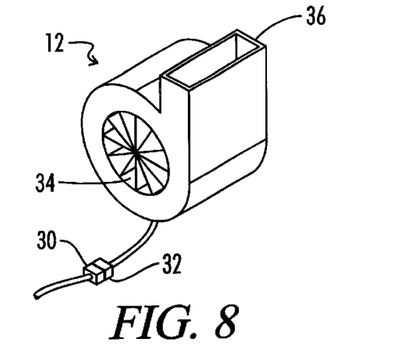
FIGS. 8 and 9 are perspective views of a fan used with the first embodiment of the present invention.
Figure 9:
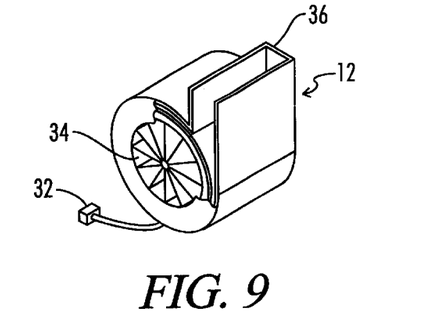

Referring back to FIG. 2, the fan 12 is connected to an AC power source (not shown) using quick electrical connect/disconnect fittings, 30 and 32. The fan 12 includes a fan air inlet opening 34 and a fan air outlet opening 36 (see also FIGS. 8 and 9), which is positioned adjacent to the lid air outlet opening 20. The fan 12 is operable to generate and propel an air stream 38 out of the fan air outlet opening 36 and through the lid air outlet opening 20. A variety of conventional fans, such as tube axial fans, cross flow blowers, motorized impellers, and axial fans, are known in the art and may be used with the present invention.

Referring to FIG. 3, the first embodiment of the present invention is shown in use directing the air stream 38 toward a park bench 40. The housing 10 is buried in the ground 16, the fan 12 is inserted into the housing 10 and connected to an AC power source (not shown) using the quick electrical connect/disconnect fittings, 30 and 32, (not shown in FIG. 3, but see FIG. 2) and then both the housing 10 and fan 12 are covered by the rock lid 14. Because the fan 12 is connected using the quick connect/disconnect fittings, the fan 12 can easily be inserted into or removed from the housing 10.

The rock lid 14 includes a set of air diverter veins (or air guide) 42 for controlling the direction of the air stream 38.

The air diverter veins 42 may be adjusted to direct a narrow air stream 38 or a wide air stream 38, depending upon the location of the invention and the area to be cooled. For example, the air diverter veins 42 may be adjusted to provide a narrow air stream 38 approximately 20 degrees wide or a wide air stream 38 approximately 180 degrees wide. In addition, the air diverter veins 42 may be automated to oscillate back and forth across a certain area. In this case, the present invention includes a motor (not shown) connected to the air diverter veins 42 for moving the veins 42 back and forth. Finally, the rock lid 14 also includes a conventional locking mechanism 44 for securing the lid 14 to the housing 10.

Figures 10, 11:
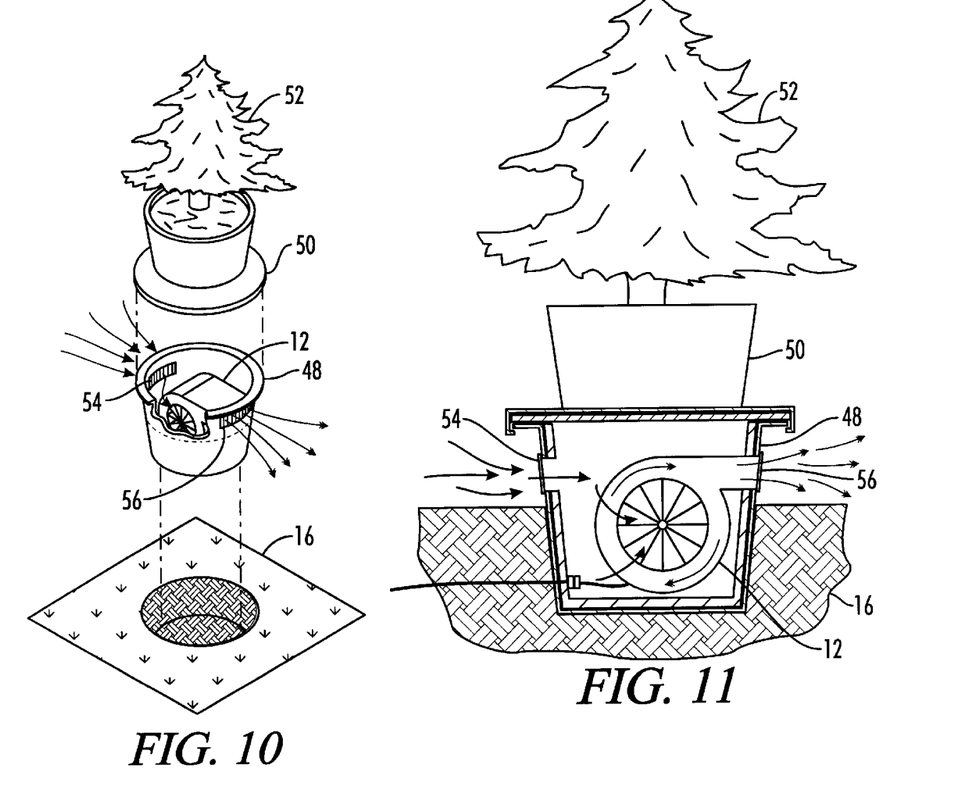
FIG. 10 is an exploded perspective view of a second embodiment of the present invention.
FIG. 11 is a cross-sectional view of the second embodiment of the present invention.
Figure 12:
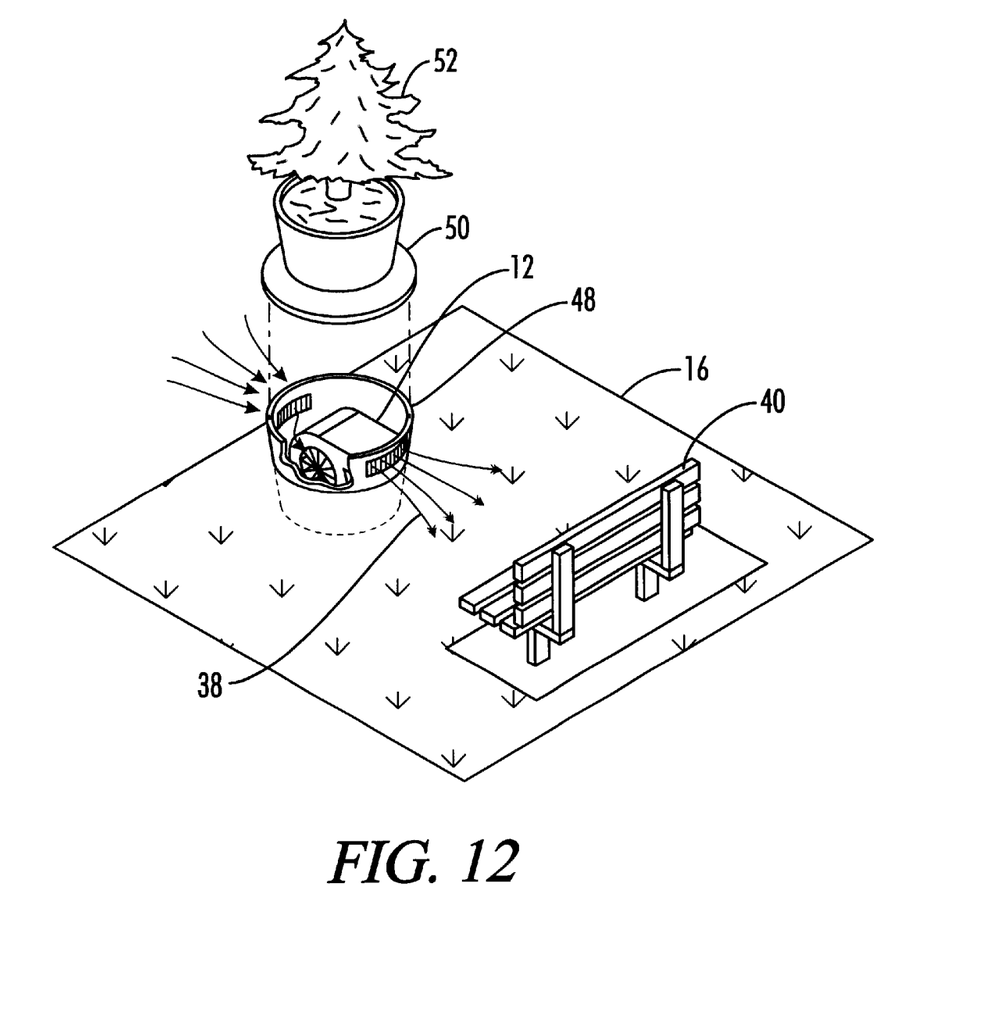
FIG. 12 is a perspective view of the second embodiment of the present invention positioned to blow an air stream on a park bench.

Referring to FIGS. 10–12, a second embodiment of the present invention includes a housing 48 partially buried in the ground 16, the fan 12 inside the housing 48, a planter lid 50 removably connected to the housing 48, and a plant 52 in the planter lid 50. The second embodiment of the present invention is identical to the first embodiment with the exception of a couple of features.

First, the second embodiment does not include lid air inlet and outlet ports, 20 and 22. Instead, the second embodiment includes a housing air inlet port 54 and a housing air outlet port 56, both of which perform the same functions provided by lid air inlet and outlet ports, 20 and 22.

Second, the rock lid 14 of the first embodiment is replaced with the planter lid 50, which includes a recess (not shown) for receiving the potted plant 52. The purpose of the planter lid 50 is identical to the purpose of the rock lid 14—to conceal the fan 12. Although the planter lid 50 shown in FIGS. 10–12 includes a single recess (not shown) and a single plant, alternative embodiments may include a variety of recesses in a variety of arrangements for holding multiple plants.

Figures 13, 14:
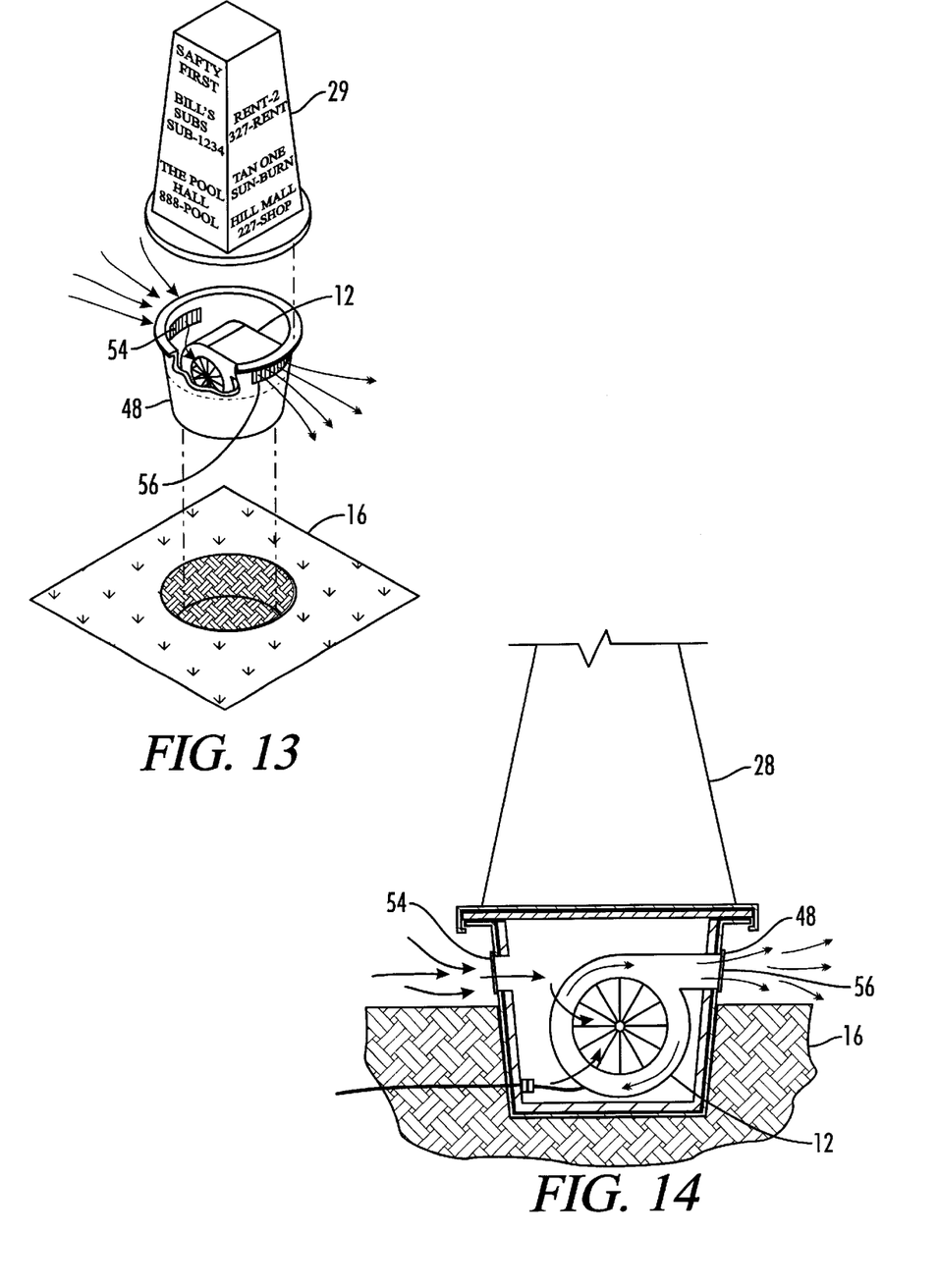
FIG. 13 is an exploded perspective view of a third embodiment of the present invention.
FIG. 14 is a cross-sectional view of the third embodiment of the present invention.

In a third embodiment (see FIGS. 13 and 14), the planter lid 50 of the present invention is replaced by the promotion sign lid 29. The promotional sign lid 29 is rectangular-shaped and includes promotional advertisements for businesses, such as restaurants, tanning salons, and malls. The third embodiment of the present invention is identical to the second embodiment with the exception of the planter lid 50 being replaced by the promotional sign lid 29.

Referring to FIGS. 15–18, a fourth embodiment of the present invention includes a housing 58, the fan 12, and a deck mount lid 62, which is adapted to be mounted beneath a deck 64. As was the case with the second and third embodiments, the fourth embodiment is identical to the first embodiment with a couple of exceptions. First, the housing 58 includes flanges, 66 and 68, for supporting the housing 58 when it is dropped down into the deck 64, and a deck housing air inlet port 70, which performs the same function as that performed by lid air inlet port 18.

Figure 15:
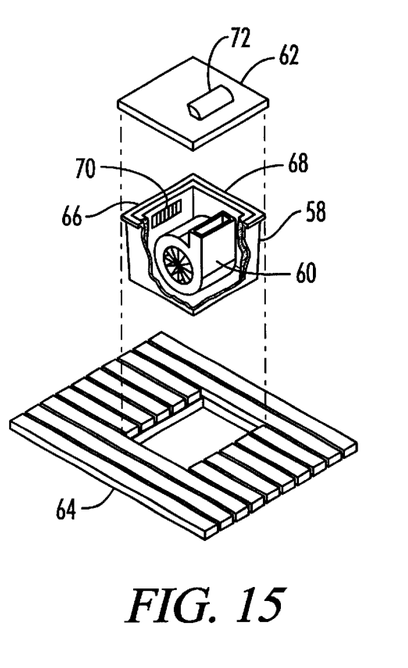
FIG. 15 is an exploded perspective view of a fourth embodiment of the present invention.
Figure 16:
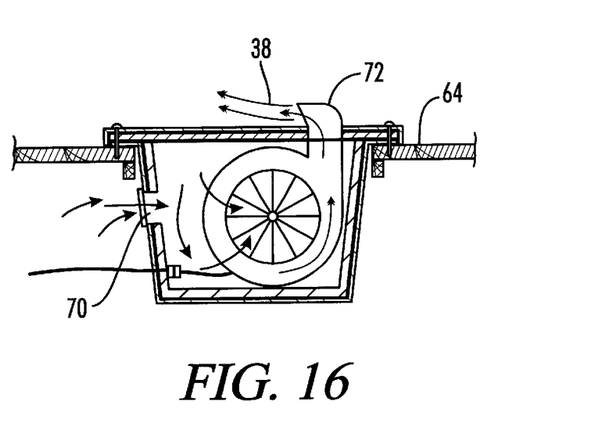
FIG. 16 is a cross-sectional view of the fourth embodiment of the present invention.
Figure 17:
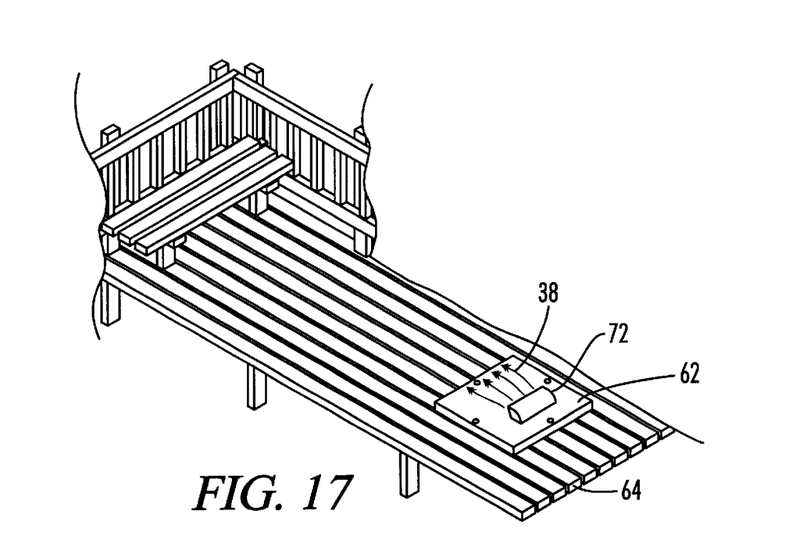
FIG. 17 is a perspective view of the fourth embodiment of the present invention connected to the underside of a deck and positioned to blow an air stream on the deck.

In addition, the rock lid 14 is replaced with deck mount lid 62, which includes a deck air outlet port 72. The deck air outlet port 72 includes a curved portion for directing the air stream 38 over the deck 64.

Figures 18, 19:
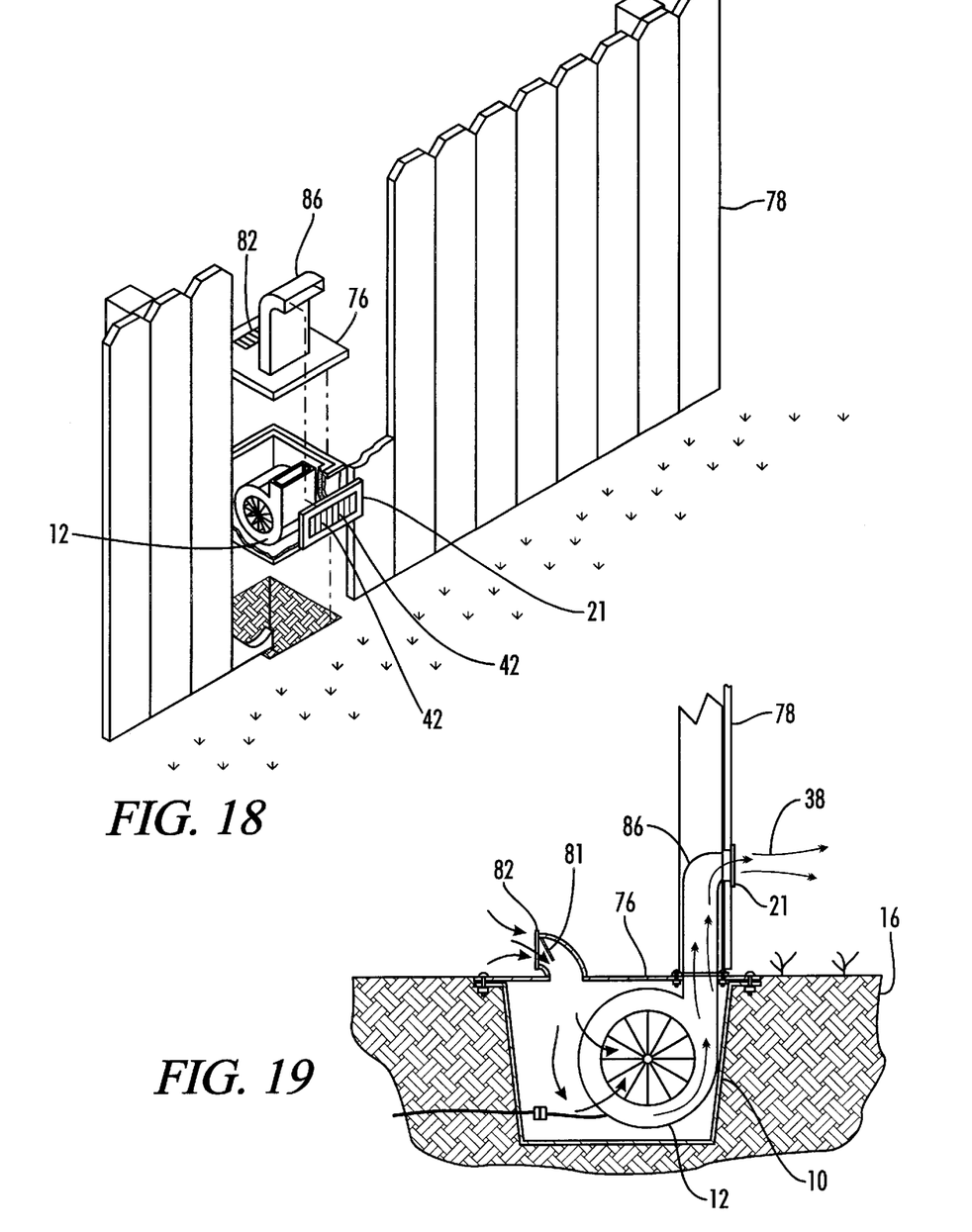
FIG. 18 is an exploded perspective view of a fifth embodiment of the present invention.
FIG. 19 is a cross-sectional view of the fifth embodiment of the present invention connected to the backside of a wooden fence.
Figure 20:
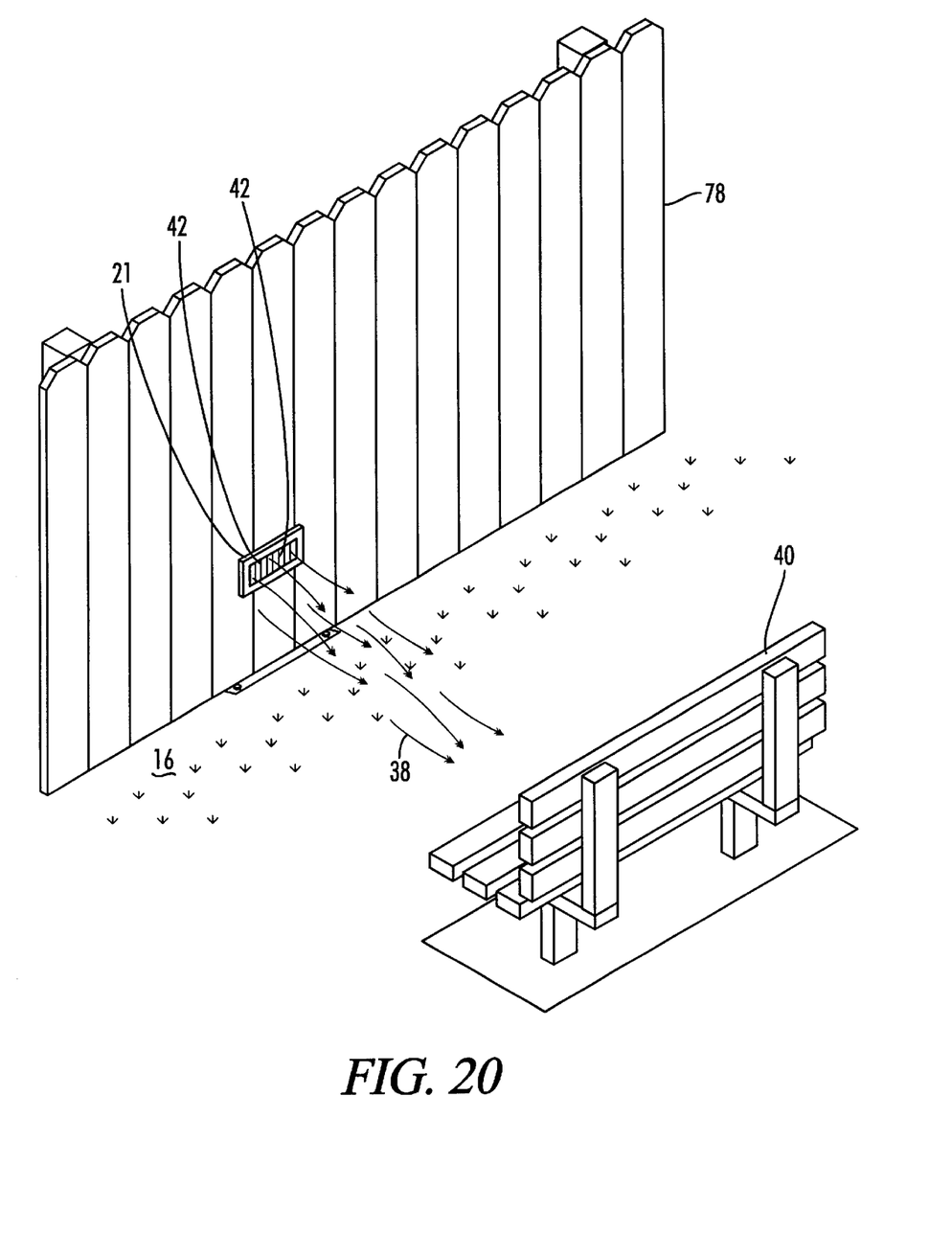
FIG. 20 is a perspective view of the fifth embodiment of the present invention connected to the backside of a wooden fence and positioned to blow an air stream in an area beside the wooden fence.
Figure 21:
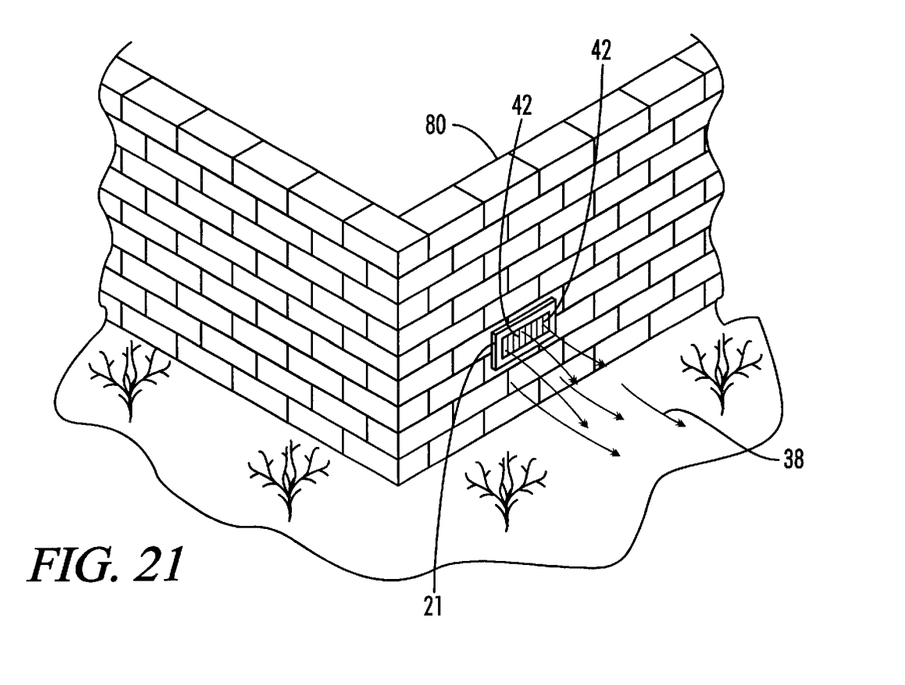
FIG. 21 is a perspective view of the fifth embodiment of the present invention connected to the backside of a brick fence and positioned to blow an air stream in an area beside the brick fence.
Figure 22:
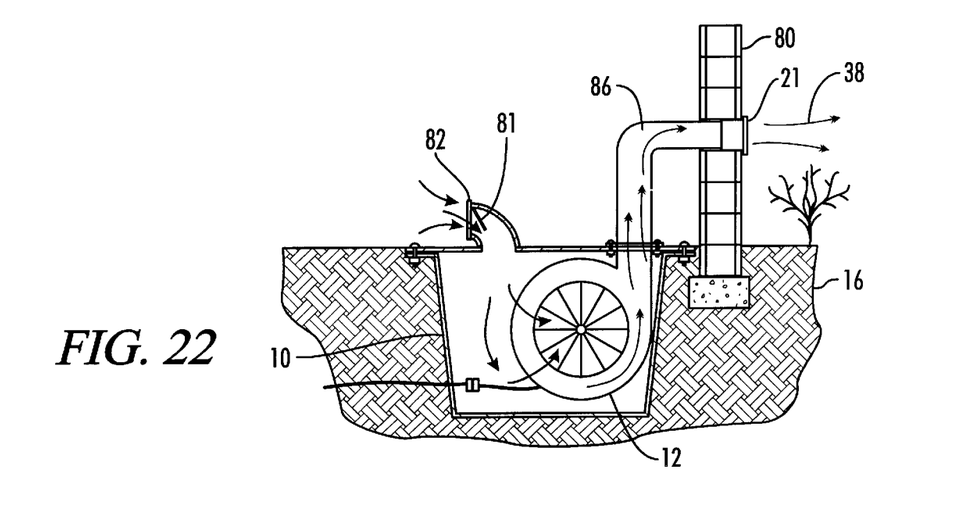
FIG. 22 is a cross-sectional view of the fifth embodiment of the present invention connected to the backside of a brick fence.

Finally, referring to FIGS. 18–22, a fifth embodiment of the present invention includes the housing 10, the fan 12, and a fence mount lid 76, which is adapted to be connected to the backside of a wooden fence 78 or a brick fence 80. The fifth embodiment is identical to the first embodiment with the exception that the rock lid 14 is replaced with the fence mount lid 76. The fence mount lid 76 includes a fence air inlet port 82, a damper 81, and a fence air outlet port 86. The fence air inlet port 82 and the fence air outlet port 86 perform the same functions as the lid air inlet port 18 and the lid air outlet port 20, respectively, in the first embodiment. The damper 81 swings open (as shown in FIGS. 19 and 22) when the system is in use to allow air to be drawn into the housing 10 by the fan 12 and swings closed when the system is not in use to prevent water from entering the housing 10.

Figure 23:
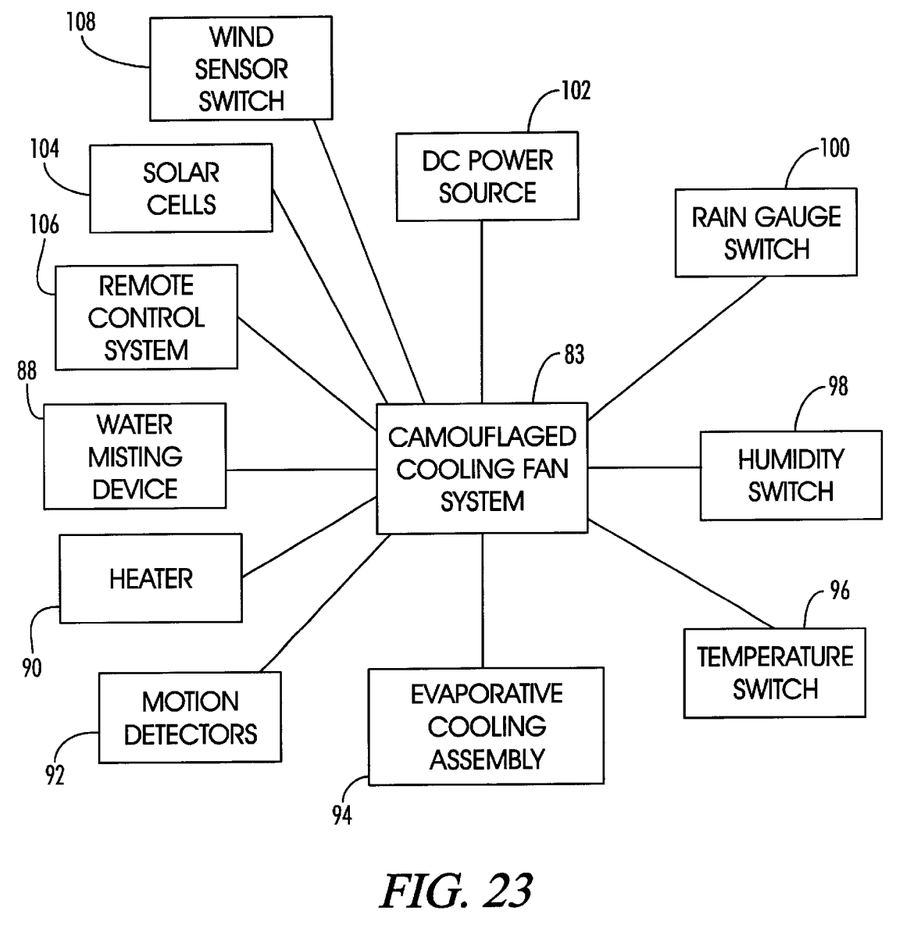
FIG. 23 is a block diagram of optional features that may be used with the present invention.
Figure 24:
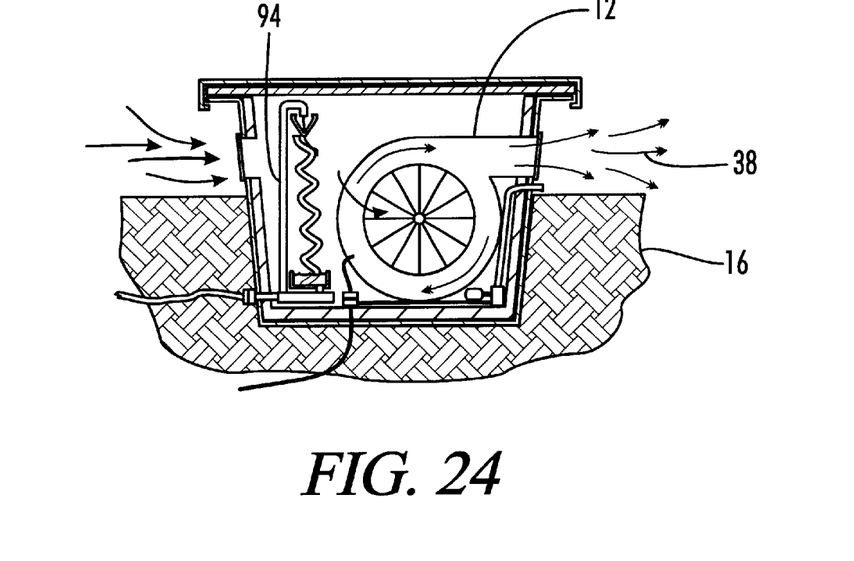
FIG. 24 is a cross-sectional view of one embodiment of the present invention that includes an evaporative cooling assembly.
Figure 25:
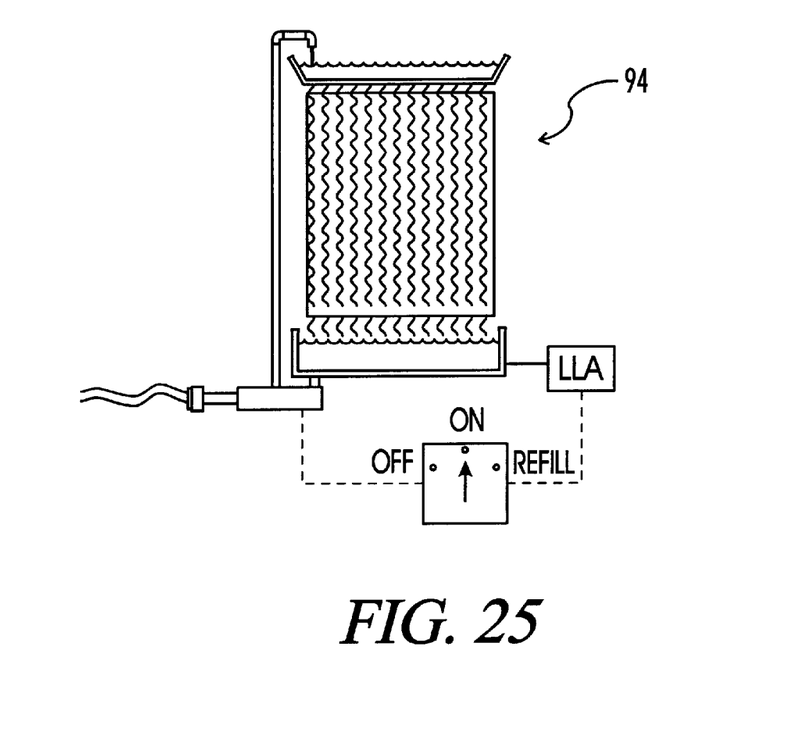
FIG. 25 is a front view of the evaporative cooling assembly shown in FIG. 24.

Referring to FIG. 23, the camouflaged fan system 83 of the present invention may include one or more of the following optional features: 1) a water-misting device 88, 2) a heater 90, 3) motion detectors 92, 4) an evaporative cooling assembly 94, i.e., a "swamp cooler" assembly, 5) a temperature switch 96, 6) a humidity switch 98, 7) a rain gauge switch 100, 8) a dc power source 102, i.e., a battery, 9) solar cells 104, 10) a remote control system 106, or 11) a wind sensor switch 108. The water-misting device 88 may be inserted into the housing of a particular embodiment to inject a mist (not shown) into the air stream 38 to enhance the cooling effect of the air stream 38. In a similar manner, the evaporative cooling device 88 may be inserted into the housing of a particular embodiment to cool air as it is drawn into the housing (see FIGS. 24 and 25).

The heater 90 may be inserted into the housing of a particular embodiment to heat air drawn into the housing and used when outside temperatures drop below a certain level. The motion detectors 92 may be connected to the lid or housing of a particular embodiment and used to control the invention based on movement close to the invention. When movement is detected, the invention is turned on. When no movement is detected for a certain period of time, the invention is turned off.

The temperature switch 96, humidity switch 98, rain gauge switch 100, and wind sensor switch 108 all may be connected to the lid or housing of a particular embodiment and may be used to turn the invention on and off based on changing environmental conditions. For example, the temperature switch 96 may be used to turn the invention on when a certain temperature is exceeded, the humidity switch 98 may be used to turn the invention on when a certain humidity level is exceeded, the rain gauge switch 100 may be used to turn the invention off when it detects rain, and the wind sensor switch 108 may be used to turn the invention off when a certain wind level is exceeded.

The dc power source 102 may be inserted into the housing of a particular embodiment and used for applications where an ac power source is not easily available or as a back-up power source for an ac power source. In a similar manner, solar cells 104 may be connected to the lid or housing of a particular embodiment and used to supply power to the invention. Finally, the remote control system 106 may be inserted into the housing or lid and used to remotely control all the functions of the present invention.

Thus, although there have been described particular embodiments of the present invention of a new and useful Outdoor Fan System, it is not intended that such references be construed as limitations upon the scope of this invention except as set forth in the following claims.

The invention claimed is:

1. An outdoor fan system, comprising:
   a housing adapted to be inserted into land;
   a lid adapted to look similar to a rock and connected to the housing;
   an air inlet port located on the housing or the lid and adapted to allow air to pass into the housing;
   a screen connected to the air inlet port and adapted to allow air, and to prevent bugs, from passing through;
   an air outlet port located on the housing or the lid and adapted to allow an air stream having a predetermined size to pass out of the housing in a predetermined direction;
   an air guide connected to the air outlet port and adapted to control the size and direction of the air stream; and
   a fan inside the housing and adapted to be connected to a power source using quick electrical connect/disconnect fittings.

2. The system of claim 1, wherein the housing is adapted to be soundproof.

3. The system of claim 1, wherein the housing is adapted to be mildew resistant.

4. The system of claim 1, wherein the lid is adapted to be ultraviolet resistant.

5. The system of claim 1, further comprising a water-misting device inside the housing and adapted to inject a mist into the air stream.

6. The system of claim 1, further comprising a cooling assembly inside the housing and adapted to cool the air stream.

7. An outdoor fan system, comprising:
   a housing adapted to be connected to a plurality of different types of lids;
   a lid connected to the housing;
   an air inlet port located on the lid or the housing and adapted to allow air to pass into the housing;
   an air outlet port located on the lid or the housing and adapted to allow an air stream having a predetermined size to pass out of the housing in a predetermined direction; and
   a fan inside the housing and adapted to be connected to a power source.

8. The system of claim 7, further comprising a heater inside the housing and adapted to heat the air stream.

9. The system of claim 7, wherein the fan is adapted to be connected to the power source using quick electrical connect/disconnect fittings.

10. The system of claim 7, further comprising an air guide connected to the air outlet port and adapted to control the size and direction of the air stream.

11. An outdoor fan system, comprising:
    a housing adapted to be connected to a plurality of different types of lids and adapted to be inserted into land;
    a lid connected to the housing;
    an air inlet port located on the lid or the housing and adapted to allow air to pass into the housing;
    an air outlet port located on the lid or the housing and adapted to allow an air stream having a predetermined size to pass out of the housing in a predetermined direction; and
    a fan inside the housing and adapted to be connected to a power source.

12. The system of claim 11, wherein the housing is the lid is adapted to look like a rock.

13. The system of claim 11, wherein the lid includes a garden hose reel.

14. The system of claim 11, wherein the lid includes a birdbath.

15. The system of claim 11, wherein the lid includes a bird feeder.

16. An outdoor fan system, comprising:
    a housing adapted to be connected to a plurality of different types of lids and adapted to be inserted into land;
    a lid connected to the housing;
    an air inlet port located on the lid or the housing and adapted to allow air to pass into the housing;

an air outlet port located on the lid or the housing and adapted to allow an air stream having a predetermined size to pass out of the housing in a predetermined direction; and a fan inside the housing and adapted to be connected to a power source using quick electrical connect/disconnect fittings.

17. The system of claim 16, wherein the lid includes a promotional sign.

18. The system of claim 16, wherein the lid includes a planter.

19. An outdoor fan system, comprising:

a housing adapted to be connected to a plurality of different types of lids and adapted to be inserted into land;

a lid connected to the housing;

an air inlet port located on the housing or the lid and adapted to allow air to pass into the housing;

an air outlet port located on the housing or the lid and adapted to allow an air stream having a predetermined size to pass out of the housing in a predetermined direction; and a fan inside the housing and adapted to be connected to a power source using quick electrical connect/disconnect fittings, the fan further adapted to operate based on wind around the fan system.

20. The system of claim 19, wherein the housing and lid are adapted to be locked together so that the lid cannot be disconnected from the housing and unlocked so that the lid can be disconnected from the housing.

21. The system of claim 19, wherein the fan is adapted to operate based on motion around the fan system.

22. The system of claim 19, wherein the fan is adapted to operate based on temperature around the fan system.

23. The system of claim 19, wherein the fan is adapted to operate based on humidity around the fan system.

* * * * *